US012650624B2

(12) United States Patent
Rodrigues

(10) Patent No.: US 12,650,624 B2
(45) Date of Patent: Jun. 9, 2026

(54) AMBIENT REFLECTIVE DISPLAY WITH COLOR FILTERS

(71) Applicant: Toyota Motor Engineering & Manufacturing North America, Inc., Plano, TX (US)

(72) Inventor: Sean P. Rodrigues, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 18/596,857

(22) Filed: Mar. 6, 2024

(65) Prior Publication Data

US 2025/0284159 A1 Sep. 11, 2025

(51) Int. Cl.
| | |
|---|---|
| *G02F 1/1335* | (2006.01) |
| *B60K 35/22* | (2024.01) |
| *G02F 1/1337* | (2006.01) |
| *G02F 1/1343* | (2006.01) |
| *G02F 1/137* | (2006.01) |

(52) U.S. Cl.
CPC ........ *G02F 1/133618* (2021.01); *B60K 35/22* (2024.01); *G02F 1/133512* (2013.01); *G02F 1/133514* (2013.01); *G02F 1/133543* (2021.01); *G02F 1/133723* (2013.01); *G02F 1/134336* (2013.01); *G02F 1/13756* (2021.01); *B60K 2360/1523* (2024.01); *B60K 2360/785* (2024.01)

(58) Field of Classification Search
CPC .......... G02F 1/136209; G02F 1/13756; G02F 1/134318; G02F 1/133553; G02F 1/133555; G02F 1/133557; G02F 1/133618; B60K 2360/1523; B60K 2360/1526
USPC ...................... 349/110–11, 29, 110–111, 113
See application file for complete search history.

(56) References Cited

U.S. PATENT DOCUMENTS

| | | | | |
|---|---|---|---|---|
| 3,938,879 | A | * | 2/1976 | Dalmasso ............. G02F 1/1335 |
| | | | | 349/158 |
| 5,608,837 | A | | 3/1997 | Tai et al. |
| 10,324,237 | B2 | | 6/2019 | Soljacic et al. |
| 11,747,541 | B1 | | 9/2023 | Rodrigues et al. |

(Continued)

FOREIGN PATENT DOCUMENTS

| | | | | | |
|---|---|---|---|---|---|
| CN | 1573438 | A | * | 2/2005 | ....... G02F 1/136209 |
| WO | 2020/133811 | A1 | | 7/2020 | |
| WO | 2023/076256 | A1 | | 5/2023 | |

*Primary Examiner* — Jessica M Merlin
(74) *Attorney, Agent, or Firm* — Christopher G. Darrow; Darrow Mustafa PC

(57) ABSTRACT

Various arrangements described herein relate to a display that uses ambient light to generate images. In one embodiment, a display is disclosed. The display includes an inside transparent layer disposed parallel to and spaced apart from an outside transparent layer. The display includes a liquid crystal (LC) layer disposed between the inside transparent layer and the outside transparent layer. The display includes ground electrodes disposed between the LC layer and the outside transparent layer. The display includes pixel electrodes disposed between the inside transparent layer and the LC layer. The display includes light filters arranged relative to the pixel electrodes and the ground electrodes to form pixels with separate colors of each pixel being formed from individual ones of the light filters.

19 Claims, 7 Drawing Sheets

| | |
|---|---|
| ▨ Transparent Layer | ▨ Blue Pixel Electrode |
| ▧ Polyimide Layer | ⬚ Red Pixel Electrode |
| ▮ Black Mask | ▨ Polystyrene Support |
| ▨ Common Electrode | ▨ Blue Light Filter |
| | ⬚ Red Light Filter |

(56) References Cited

U.S. PATENT DOCUMENTS

| | | | |
|---|---|---|---|
| 2003/0038906 A1* | 2/2003 | Fujimoto | G02F 1/133553 |
| | | | 349/113 |
| 2003/0231266 A1* | 12/2003 | Ma | A61N 1/3752 |
| | | | 349/115 |
| 2004/0149989 A1* | 8/2004 | Matsunaga | H10D 30/6723 |
| | | | 257/E27.111 |
| 2005/0162597 A1* | 7/2005 | Wachi | G02F 1/134336 |
| | | | 349/138 |
| 2006/0001806 A1* | 1/2006 | Uh | G02F 1/133615 |
| | | | 349/114 |
| 2007/0222934 A1* | 9/2007 | Huang | G02F 1/13394 |
| | | | 349/155 |
| 2015/0355521 A1* | 12/2015 | Alton | G01J 1/4204 |
| | | | 250/214 AL |
| 2016/0225832 A1* | 8/2016 | Kwon | H10K 50/818 |
| 2017/0351128 A1 | 12/2017 | Collins et al. | |
| 2019/0146216 A1* | 5/2019 | Mourou | B60J 3/04 |
| | | | 280/781 |
| 2020/0327849 A1 | 10/2020 | Hong | |
| 2020/0348790 A1* | 11/2020 | Vampola | G09G 3/3406 |
| 2020/0363681 A1 | 11/2020 | Whitehead et al. | |
| 2021/0198575 A1* | 7/2021 | Zhang | C09K 19/2007 |

* cited by examiner

AMBIENT REFLECTIVE DISPLAY WITH COLOR FILTERS

TECHNICAL FIELD

The subject matter described herein relates, in general, to transparent displays, and, in particular, to a transparent display that functions using ambient light and color filters.

BACKGROUND

Transparent displays are a type of viewing panel that provides images to viewers but is also transparent from at least one viewing perspective. Thus, such displays may appear clear when not in use, in areas with no image displayed, or when viewed from behind where no image is generated. That is, a displayed image may appear to be opaque or slightly transparent, while areas not displaying the image are transparent. However, because of the transparent nature of such displays, lighting the displays can be difficult and generally relies on LED lights that inject light at the sides. As a result, the displays can suffer from difficulties with brightness and low contrast ratios in addition to difficulty viewing in different lighting conditions.

SUMMARY

Various embodiments relate to transparent displays that use ambient light and filters to generate images. As noted previously, transparent displays may encounter difficulties with brightness, contrast ratios, etc., due to limitations on the configuration of elements within the display. Accordingly, in at least one approach, a presently disclosed configuration overcomes the noted difficulties by providing a unique arrangement of elements that provide for a display that uses ambient light to illuminate images while avoiding difficulties associated with other approaches. For example, a display is formed by sandwiching multiple layers of elements together. The separate elements serve different roles in the display and generally include an outside transparent layer, a ground electrode, light filters, a liquid crystal (LC) layer, pixel electrodes, and an inside transparent layer, among others. The pixel electrodes, along with the ground electrodes and the light filters, define pixels within the display. Thus, as ambient light is incident upon the light filters, the light filters transmit only a desired wavelength of light. The electrodes can then be used to control the LC layer and selectively reflect light from different subpixels associated with the separate light filters having different wavelength properties.

In at least one approach, the LC layer is comprised of a graded cholesteric liquid crystal (CLC) that, when activated, becomes reflective, thereby reflecting the ambient light that was filtered by the associated light filter. In this way, the subpixels provide for reflecting different wavelengths of light (e.g., red, green, and blue) and do not require an active light source integrated with the display. Moreover, the display may further include active components to determine characteristics of the ambient light itself in order to adapt how the subpixels are activated. That is, the ambient light may have different intensities, color profiles, and so on and may not be a uniform white light as in the case of some integrated light sources. As such, the display may include a camera to sense the characteristics of the ambient light and adapt how the subpixels are activated (e.g., duration of activation, color selection, etc.). In this way, the construction of the display improves image quality while using ambient light and, thereby avoiding difficulties associated with integrated light sources.

In one embodiment, a display is disclosed. The display includes an inside transparent layer disposed parallel to and spaced apart from an outside transparent layer. The display includes a liquid crystal (LC) layer disposed between the inside transparent layer and the outside transparent layer. The display includes ground electrodes disposed between the LC layer and the outside transparent layer. The display includes pixel electrodes disposed between the inside transparent layer and the LC layer. The display includes light filters arranged relative to the pixel electrodes and the ground electrodes to form pixels with separate colors of each pixel being formed from individual ones of the light filters.

In another embodiment, a transparent display is disclosed. The transparent display includes an inside transparent layer disposed parallel to and spaced apart from an outside transparent layer. The display includes a liquid crystal (LC) layer disposed between the inside transparent layer and the outside transparent layer and being formed from a graded cholesteric liquid crystal (CLC). The display includes ground electrodes disposed between the LC layer and the outside transparent layer. The display includes pixel electrodes disposed between the inside transparent layer and the LC layer. The display pixels form from an arrangement of light filters relative to the pixel electrodes and the ground electrodes with subpixels of the separate pixels being formed from individual ones of the light filters.

In one embodiment, a vehicle window is disclosed. The window includes an inside transparent layer disposed parallel to and spaced apart from an outside transparent layer. The window includes a liquid crystal (LC) layer disposed between the inside transparent layer and the outside transparent layer and being formed from a graded cholesteric liquid crystal (CLC). The window includes ground electrodes disposed between the LC layer and the outside transparent layer. The window includes pixel electrodes disposed between the inside transparent layer and the LC layer. The window includes pixels formed from an arrangement of light filters relative to the pixel electrodes and the ground electrodes, with subpixels of the separate pixels being formed from individual ones of the light filters. The window includes a control module configured to acquire characteristics of the ambient light from at least one sensor of the display and to control the pixels to display an image according to the characteristics by adjusting a duration of exposure for the subpixels to account for variations in the characteristics.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Various embodiments of a display are disclosed herein that relate to transparent displays that use ambient light and filters to generate images. As noted previously, transparent displays may encounter difficulties with brightness, contrast ratios, etc., due to limitations on the configuration of elements within the display. Accordingly, in at least one approach, a presently disclosed configuration overcomes the noted difficulties by providing a unique arrangement of elements that provide for a display that uses ambient light to illuminate images while avoiding difficulties associated with other approaches. For example, a display is formed by sandwiching multiple layers of elements together. The separate elements serve different roles in the display and generally include an outside transparent layer, a ground electrode, light filters, a liquid crystal (LC) layer, pixel electrodes, and an inside transparent layer, among others. In any case, the pixel electrodes, along with the ground electrodes and the light filters, define pixels within the display. The light filters function to provide the different colors for generating the images and may be bandpass filters that filter specific wavelengths of light to provide the appropriate color. For example, as ambient light is incident upon the light filters, the light filters transmit only a desired wavelength of light (e.g., red, green, blue). The electrodes can then be used to control the LC layer at the specific subpixels and selectively reflect light from different subpixels associated with the separate light filters having different wavelength properties.

In at least one approach, the LC layer is comprised of a graded cholesteric liquid crystal (CLC) that, when activated, becomes reflective, thereby reflecting the ambient light that was filtered by the associated light filter. In this way, the subpixels provide for reflecting different wavelengths of light (e.g., red, green, and blue) and do not require an active light source integrated with the display. Moreover, the display may further include active components to determine characteristics of the ambient light itself in order to adapt how to activate the subpixels. That is, the ambient light may have different intensities, color profiles, and so on and may not be a uniform white light as in the case of some integrated light sources. As such, the display may include a camera to sense the characteristics of the ambient light and adapt how the subpixels are activated (e.g., duration of activation, color selection, etc.). In this way, the construction of the display improves the contexts in which the display may be used along with image quality while using ambient light and, thereby, avoiding difficulties associated with integrated light sources.

Figure 1:
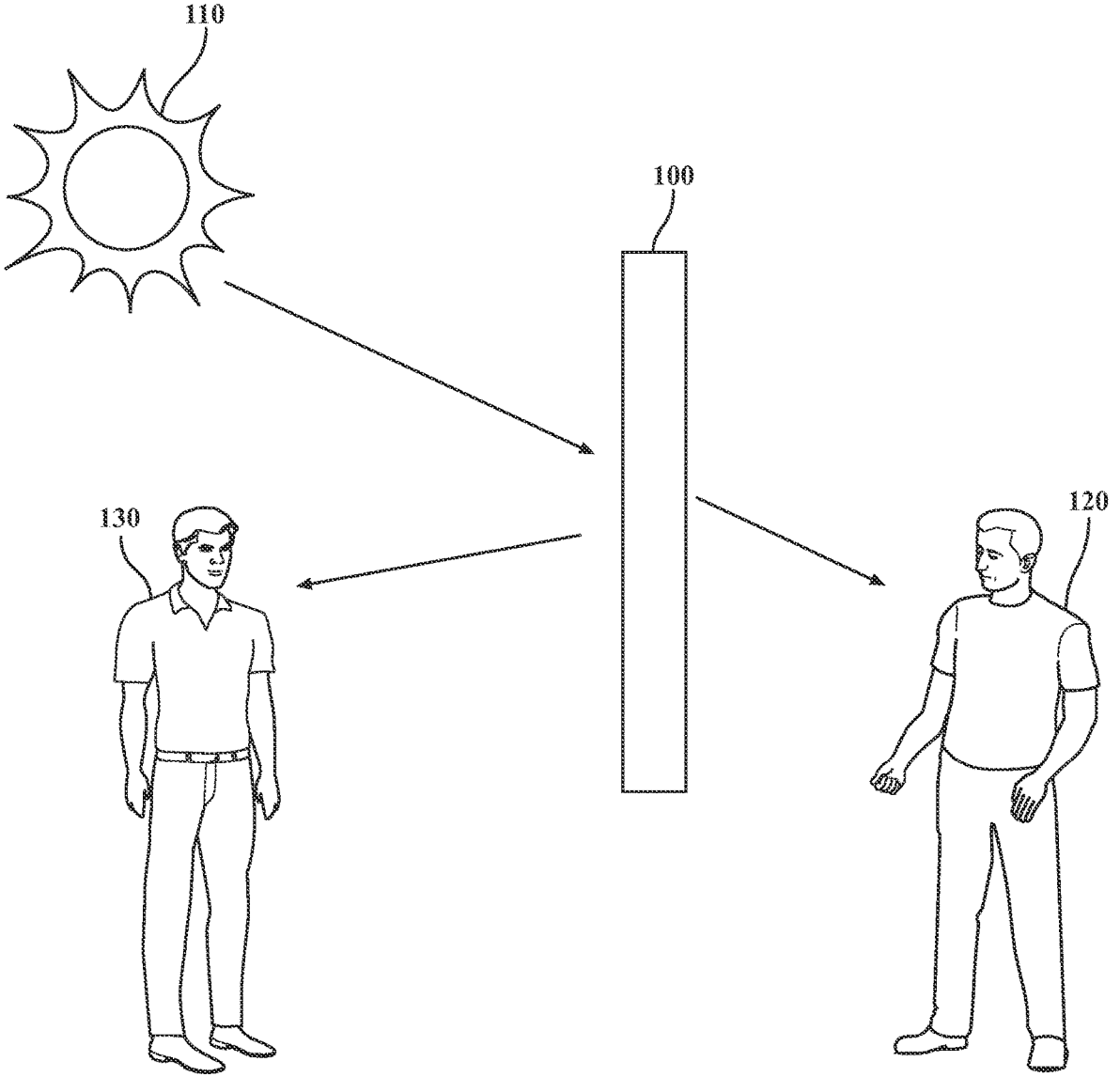
FIG. 1 illustrates one example of a context in which the disclosed display may be implemented.

With reference to FIG. 1., a general context in which a display 100 may be implemented is shown. The display 100 is understood to be a transparent display in that the display 100 transmits ambient light 110 from an external/outside-facing surface of the display 100 to an inside-facing direction. That is, the display 100 permits light to pass through it with, in one embodiment, 80% efficiency. Accordingly, to an observer 120 on an inside-facing direction of the display 100, the display 100 may appear slightly tinted, similar to a tinted vehicle window. To an external observer 130, the display 100 reflects a portion of the ambient light to display an image while further allowing light from the inside to pass through to the outside, and thus areas that are not displaying the image may appear to be tinted. It should be noted that while reference is made to "inside" and "outside", these terms are used only in relation to a particular context of the display 100 being implemented as a window, such as in a vehicle. More broadly, the "outside" corresponds to an active side of the display 100 that is configured to display an image using the ambient light 110 and the inside is an inactive side of the display 100 that is not displaying an image but is instead acting as a window pane. In regards to the ambient light 110, the ambient light 110 is generally any source of light that is not directly generated by the display 100. Thus, in various circumstances, the ambient light 110 may be light from the sun, from street lights, or from other artificial sources (e.g., headlights, building lights, etc.).

Figure 2:
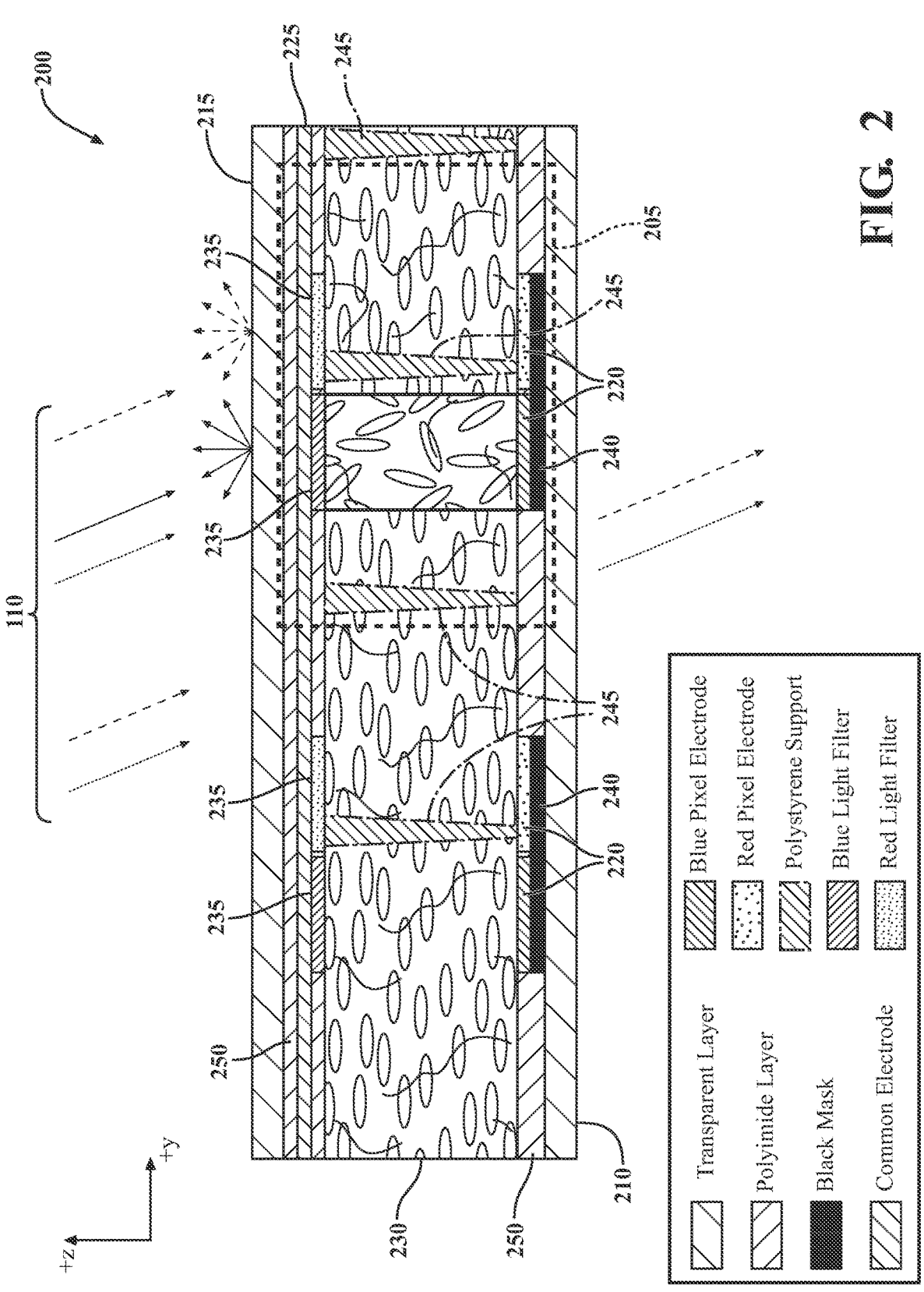
FIG. 2 illustrates one example of a cross-section view of a display.

Turning to FIG. 2, one arrangement of a display 100 is shown from a cross-sectional view 200 along the y-axis. The display 100 is formed into a panel (e.g., a window pane) with a plurality of pixels. One example of a pixel 205 is outlined and is formed from a combination of layers, including, for example, light filters, ground electrodes, pixel electrodes, and elements of other layers. As used herein, the term "inside" refers to a −z side of the display 100 shown in the figures. The term "outside" refers to a +z side of the display 100. For example, in some variations, the inside is an interior side of a vehicle window, and the outside is an exterior side of the vehicle window. However, it should be understood that the terms inside and outside are used herein for the purpose of description, and the display 100 may be arranged in any manner to display images. Moreover, the pixels, such as pixel 205, reflect light in the +z direction, as illustrated. Accordingly, it should be appreciated that a controller actively and selectively controls a plurality of pixels within the display 100 to form images that are displayed toward the outside. As will be discussed in greater detail subsequently, the controller can further dynamically adapt how the separate pixels and subpixels are activated, as shown with one of the subpixels of the pixel 205 being active as exhibited by differences in a structure of the LC layer.

In general, the pixels are disposed between an inside transparent layer 210 and an outside transparent layer 215. The transparent layers 210/215 are spaced apart and are parallel to one another. The transparent layers 210/215 are generally planar surfaces having a defined thickness in the z-axis. Also, the transparent layers 210/215 have an inner surface and an outer surface. As a non-limiting example, the transparent layers 210/215 may be comprised of glass, polymers, and/or ceramics. In general, the transparent layers 210/215 exhibit a characteristic of being substantially transparent, i.e., light transmitting without attenuating light.

With further reference to the construction of the display 100, the pixels are formed from an arrangement of various electrodes in relation to the light filters. For example, the pixel electrodes 220 are transparent (e.g., at least 65% light transmitting) and are the active electrodes. The electrodes 220 are formed from, in various arrangements, indium tin oxide (ITO), or another suitable electrode material for transparent displays. A ground electrode 225 extends in a perpendicular direction to the pixel electrodes 220 and apart from the pixel electrodes 220 being separated by a liquid crystal (LC) layer 230. The ground electrode 225 is similarly formed from indium tin oxide (ITO), or another suitable electrode material for transparent displays. It should be appreciated that the ground electrode 225 forms a complete circuit in relation to the pixel electrodes 220 in order to provide for activating areas of the LC layer 230 disposed therebetween, which forms the pixels. Furthermore, the pixels are also formed from and are given separate color properties via light filters 235 that correspond in location with the electrodes 220/225 to provide for activating corresponding areas associated with the filters to produce light of different colors. In general, each pixel comprises multiple subpixels defined by separate ones of the light filters. In one arrangement, each pixel includes three separate subpixels with one each for red, green, and blue light filtering. The light filters 235 are, in one arrangement, bandpass filters that permit a selected wavelength of light to pass while attenuating other wavelengths.

With further reference to the configuration of given pixels, the arrangement of the electrodes 220/225 function to form the pixels in relation to the light filters 235. That is, each subpixel is defined by the intersection of the electrodes 220/225 and the presence of a single light filter of a given color. The combination of three separate subpixels of different colors together within a unit cell define a pixel, such as pixel 205. With regard to pixel 205, the cross-section 200 only illustrates two subpixels since the particular arrangement of the third pixel is behind the illustrated pixels in the x-axis direction.

In various configurations, the geometric pattern formed between the electrodes 220/225 facilitates arranging the pixels in a desired manner to improve image quality and reduce the likelihood of electrical shorting. Additional details about the geometries will be described further subsequently. In any case, it should be noted that the intersections are defined in relation to how the pixel electrodes 220 and the ground electrode 225 cross while separated by the LC layer 230. These separate areas where the electrodes and the light filters cross form the subpixels that ultimately function to reflect the light of a given wavelength. Thus, the geometric pattern defines the relationships of the subpixels.

Continuing with additional details of the display 100, as shown in FIG. 2, the display 100 further includes masks 240. The masks 240 function to block the transmission of light in the −z direction. The masks 240 are disposed between the electrodes 220 and the transparent layer 210 to block light from the pixels being scattered to the inside. For example, the pixels are designed with the intention of reflecting the ambient light through the outside transparent layer 215 and not through the inside transparent layer 210. However, when the controller activates the LC layer 230 at the subpixels, the subpixels do not intentionally scatter the light in only the +z direction but may also provide light in the −z direction. As such, in order to focus the light and prevent the light from bleeding in the incorrect direction, the display includes the masks 240. The masks 240 may be formed from a material that is, for example, transparent when viewed from one direction while being reflective and/or absorbent when viewed from an opposing direction. In one configuration, the masks 240 are comprised of reflective material on a first side and light-absorbing material on a second side. In this way, the masks 240 can generally preserve the overall transparent nature of the display while facilitating focusing of the light outward. Additionally, in one or more arrangements, the masks 240 are composed of a highly absorbent material that absorbs all light from either side the display 100, however the dimensions of the black mask regions are such that the transparency of the window is not more perceived as more than a tint (i.e., the black mask consumes a relatively small area).

Returning to the LC layer 230, the LC layer 230 is a liquid crystal material, such as a cholesteric liquid crystal (CLC). The CLC may be a graded CLC, which may also be referred to as a CLC with a gradient. In general, the polymerization and orientation of the liquid crystal material and monomer induce scattering sufficient for the display 100 to generate images. In general, the LC layer 230 is induced to a cholesteric phase where the long axis is rotated about a helix. The upper ($\lambda_{max}$) and the lower ($\lambda_{min}$) boundaries of the reflected band are $\lambda_{max}$=p×n$_e$ and $\lambda_{min}$=p×n$_o$. Reorientation is achieved by creating a lightly crosslinked network dispersed within the non-reactive LC molecules (i.e., polymer-stabilized liquid crystals). To form the LC layer 230 to reflect ambient light, the LC layer 230 can be formed by embedding stacking CLC layers with different p or by embedding p gradient through polymer stabilization. This may be achieved using ultraviolet light, where the intensity is decreasing when penetrating the sample, thereby providing denser polymer networks at the surface.

In operation, the pixel electrodes 220 are configured to apply a voltage (e.g., 15-100 V @1 kHz) to the liquid crystal material in the LC layer 230. In addition, the reflection of light by the LC layer 230 sandwiched between the pair of transparent layers is controlled by voltage applied across the electrodes 220/225 at a given subpixel. That is, under one voltage condition (e.g., a first voltage), the LC layer 230 at an active subpixel is transparent and does not reflect light, while under another voltage condition (e.g., a second voltage not equal to the first voltage), the LC layer 230 at the given subpixel is reflective, thereby reflecting the ambient light passed by the light filters.

In general, the LC layer 230 has two different refractive indices, n$_e$ (extraordinary) and n$_o$ (ordinary), that depend on an electro-optical state of the liquid crystal material at a given subpixel. For example, molecules of the liquid crystal material in an "off-state" allow light to transmit since there is no disruption to the flow or propagation of light. By contrast, in the "on-state" the voltage disrupts the polymerized molecules, changing the liquid crystal alignment, thereby inducing reflecting. Accordingly, and in response to electrical control (e.g., a voltage), the molecules of the LC layer 230 orient themselves differently in the off-state and the on-state.

While not explicitly illustrated, the display 100, in at least one arrangement, includes a driver circuit that is configured to provide electrical control independently to the subpixels of each pixel. That is, the driver circuit is configured to provide electrical control independently to the pixel electrodes 220 to selectively activate the pixels. In further configurations, the driver circuit is controlled by a controller in the form of a control module (e.g., logic instructions embodied on a hardware processing unit) that functions to process an input from a camera about the characteristics of the ambient light and then adapt the way in which the driver circuit activates the separate subpixels.

Further components of the display 100 illustrated in FIG. 2 include polyimide layers 250 that are disposed adjacent to the respective transparent layers 210/215. The polyimide layers function to align the LC layer 230 and maintain the LC layer 230 in place. Further structural components include polystyrene supports 245. The polystyrene supports are, in at least one configuration, formed from polystyrene and have a quadrilateral shape, such as a trapezoid. The supports 245 may have a width of 1-2 µm. In additional arrangements, the supports 245 may be spherical. The polystyrene supports 245 function to support the transparent layers 210/215 and maintain a consistent thickness in the LC layer 230.

Figure 3:
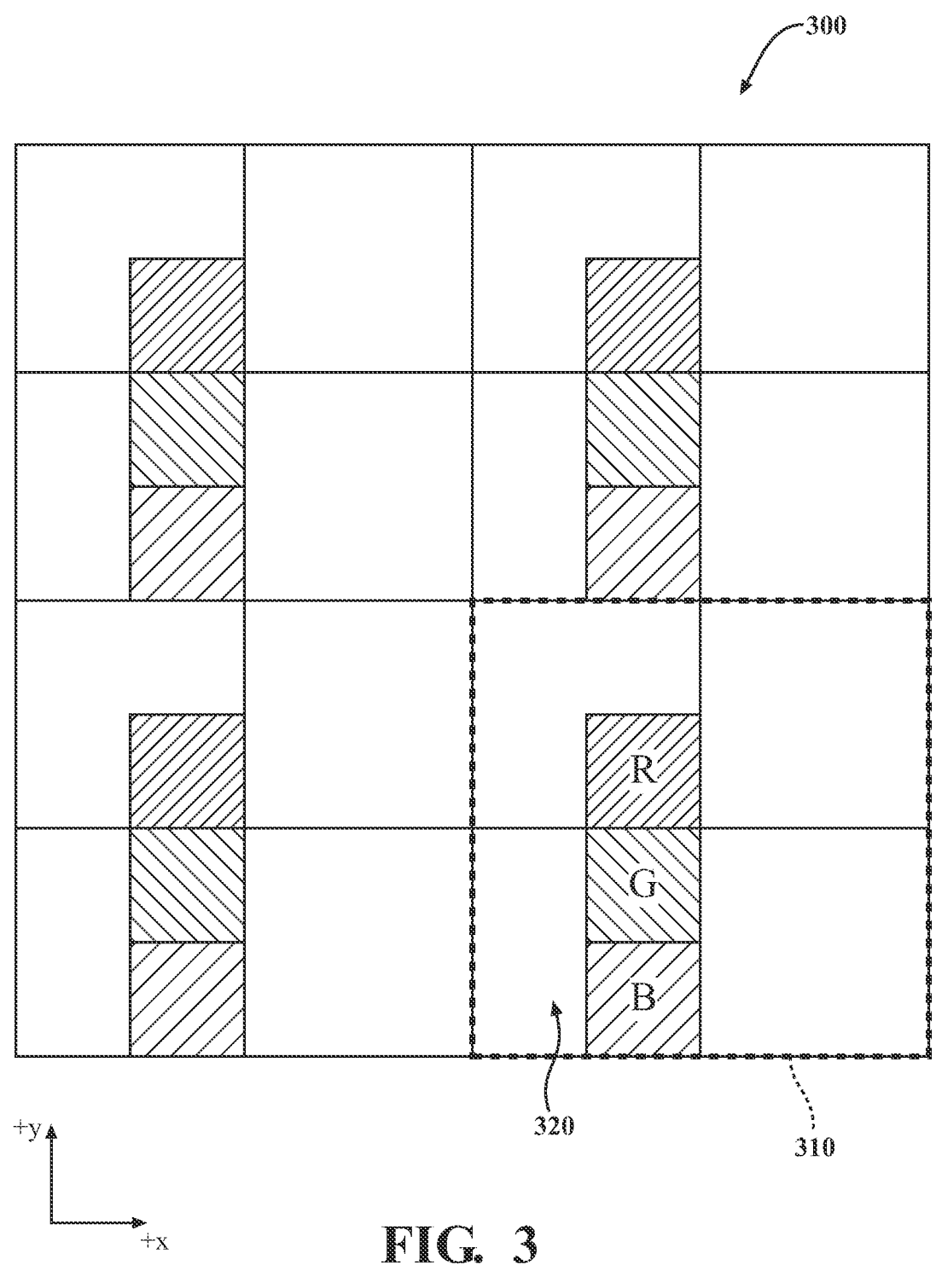
FIG. 3 illustrates one embodiment of an arrangement of pixels and subpixels.

With reference to FIG. 3, one example of an arrangement 300 of pixels and subpixels is shown. FIG. 3 illustrates a portion of a display associated with four separate pixels. A pixel 310 is highlighted for discussion and includes three subpixels labeled according to color R, G, B. White space 320 is area within the pixel 310 that is without any subpixels and is transparent. In general, the white space for each pixel is a minimum of 65% of an area of the pixel up to about 80% depending on the implementation. Accordingly, the size of the pixels may vary depending on the implementation. As one example, each pixel may have a width of 400 µm with each subpixel having a width of 100 µm. In this example, the area of the pixel is 160,000 µm and the area of the subpixels 30,000 µm, thereby providing over 80% transparent area in the instant example, although the actual transparency of the white space 320 may be less due to the presence of other semi-transparent structure (e.g., electrodes). Furthermore, the subpixels themselves may range in size from 10 µm to 110 µm. The particular arrangement of subpixels within each pixel may vary. As shown, in FIG. 3, the pixels are stacked and adjacent. The arrangement of subpixels may vary widely and is only limited by the ability to route the electrodes.

Figure 4:
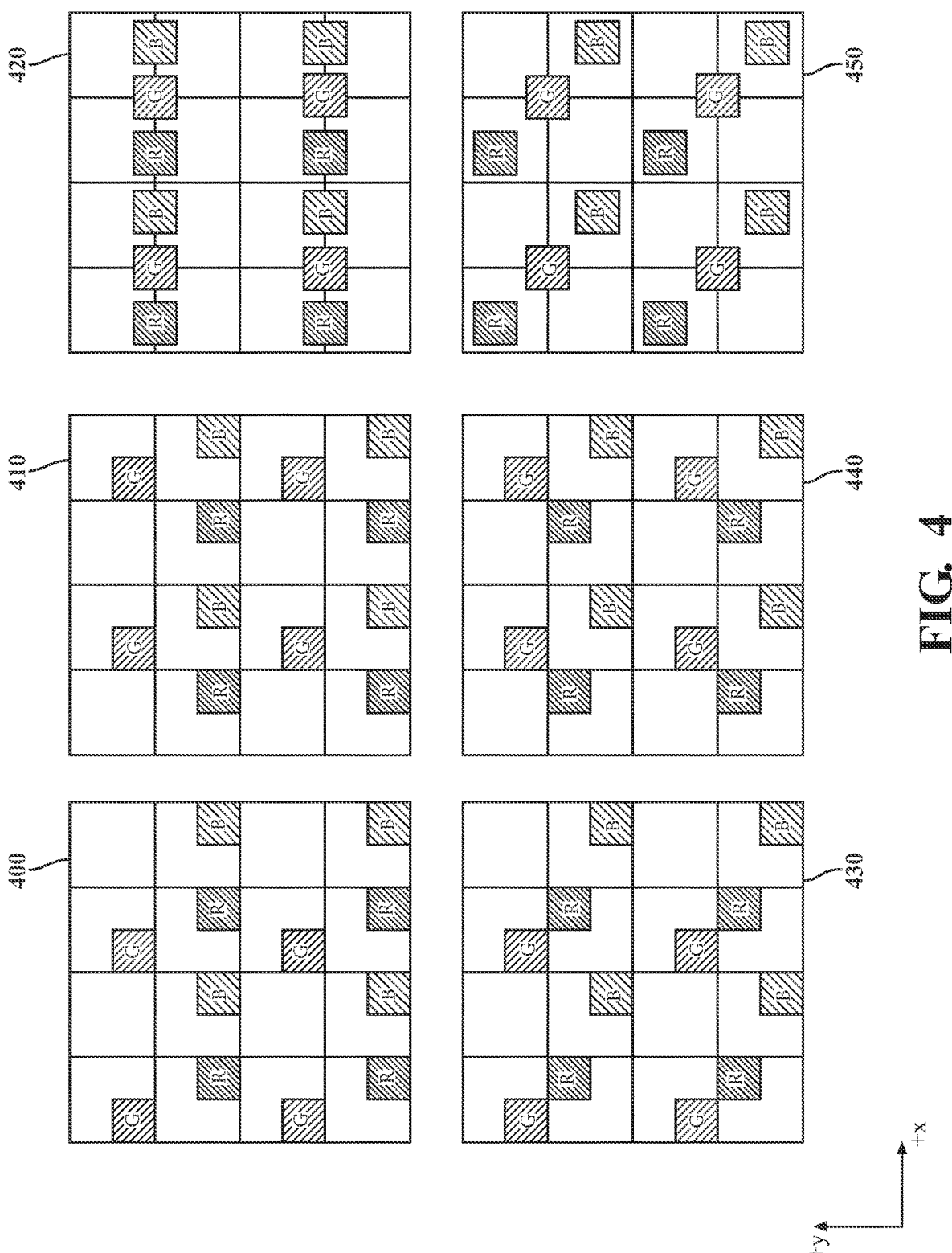
FIG. 4 illustrates further embodiments of how subpixels are arranged within pixels.

By way of example, consider FIG. 4, which shows separate arrangements of subpixels 400, 410, 420, 430, 440, and 450. Each separate arrangement 400-450 represents a distinct implementation of pixels and a distinct routing of associated electrodes. As shown, the arrangements 400-420 may be controlled via color-sequential processing, while the arrangements of 430-450 may be controlled via passive matrix processing. In either case, the arrangements 400-450 represent separate implementations of the display 100.

Figure 5:
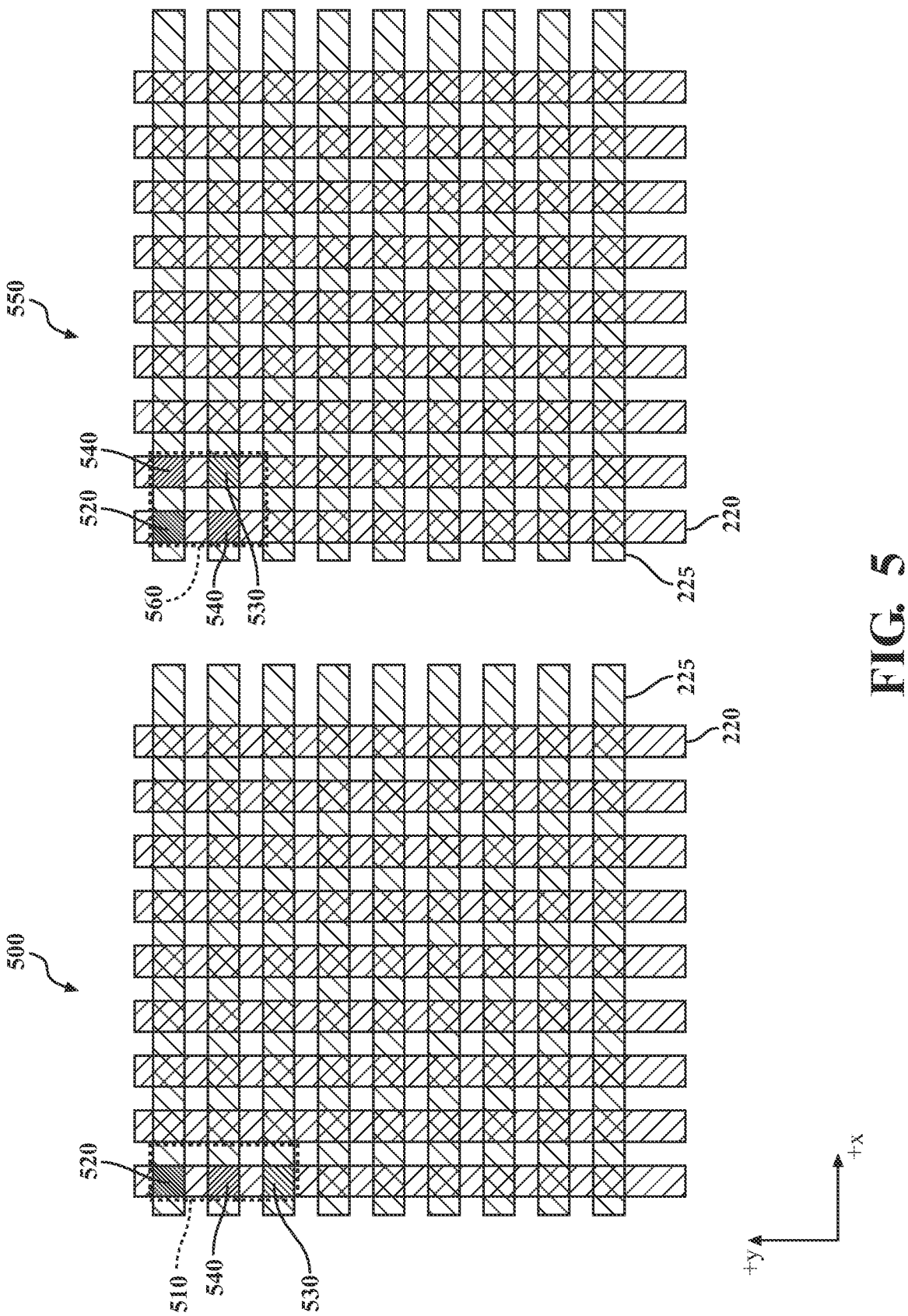
FIG. 5 illustrates example arrangements of electrodes in a display.

With reference to FIG. 5, one example of a geometric pattern 500 of the electrodes 220/225 is shown. In this example, the pixel electrodes 220 run in parallel repeating strips with the ground electrodes 225 running perpendicular thereto in similarly parallel repeating strips. The intersections of the pixel electrodes 220 with the ground electrodes 225 represent locations of the subpixels. As one example, a unit cell of a pixel 510 is enclosed with a dashed box. In this example, the pixel 510 includes three subpixels 520, 530, and 540 for three different colors. FIG. 5 also illustrates an example geometric pattern 550 of the electrodes 220/225. In this example, the unit cell 560 includes four subpixels 520-540 with 540 being repeated.

It should be appreciated, that while the electrodes 220 and 225 are shown as having the same widths and the subpixels 520-540 are illustrated as squares, the widths of the electrodes may vary in further arrangements. Moreover, FIG. 5 illustrates two examples of a unit cell 510 and 560. It should be appreciated that while the unit cells 510 and 560 are illustrated as having a particular size, in further arrangements, the unit cells 510 and 560 may be larger, such as encompassing additional active areas, including one or more additional ground electrodes and one or more additional pixel electrodes. In the illustrated example, the unit cell 560 is approximately 330 µm by 330 µm. In any case, as shown in FIG. 5, the arrangement of electrodes in the geometric pattern forms a lattice with the pixel electrodes 220 defining a first direction of the lattice and the ground electrodes 225 defining a second direction of the lattice. As previously noted, the display 100 is generally transparent and the arrangement of the subpixels has a central role in maintaining the transparency of the display 100. This is due to the correspondence of the black mask with the subpixels and the black masks absorbing light to prevent a displayed image from bleeding through the display 100. Additionally, the transparency is also influenced by other factors, including reflection, absorption, and scattering. For example, the display 100 will intrinsically have some reflection due to the air-glass interface, which may be 4-11%. The material of the electrodes 220/225 (i.e., ITO) will also absorb some light and reflect some light in the range of about 5%.

Figure 6:
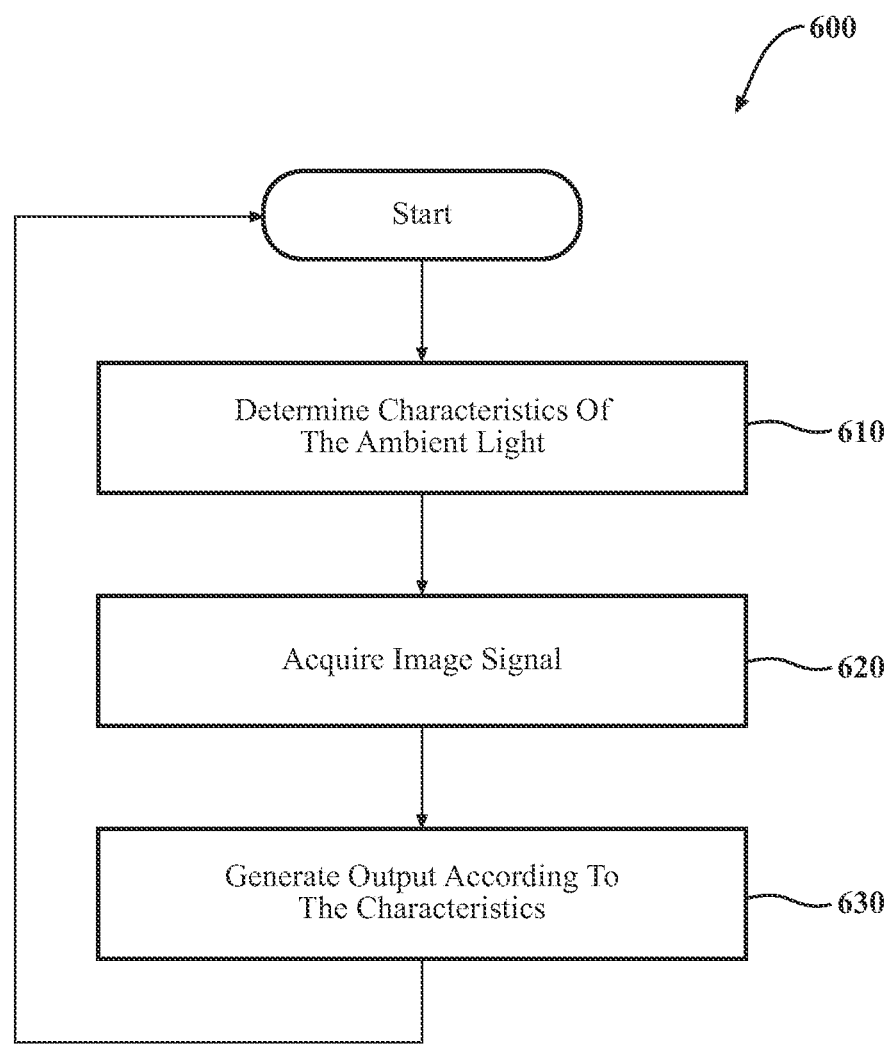
FIG. 6 is a flowchart illustrating one approach to controlling the display.

With reference to FIG. 6, one embodiment of a method 600 is illustrated in the form of a flowchart. The method 600 is associated with control of the display 100 to correct for variations in the color spectrum/intensity of the ambient light that is incident on the display 100. The method 600 is discussed from the perspective of the display 100. It should be noted that while the display 100 is broadly described as performing the method 600, in various approaches, a controller that is implemented via logic (e.g., a combination of software and/or hardware elements) may perform the noted functions.

At 610, the display 100 determines the characteristics of the ambient light. In at least one approach, the display 100 includes a camera (e.g., an RGB visible light camera) that senses at least a color spectrum and intensity of the ambient light. The characteristics are indicative of how the light will be perceived when reflecting from the light filters of the display 100.

At 620, the display 100 acquires an image signal. The image signal is an electronic representation of an image that the display 100 is to generate and display thereon. Accordingly, the image signal is generally associated with a standard/non-corrected encoding that the display 100 can determine for a common form of the ambient light (e.g., a common color spectrum and intensity).

At 630, the display 100 generates an output on the display 100 of the image signal according to the characteristics. That is, in at least one approach, the display 100 adapts the standard encoding of the image signal to correct for the characteristics so far as the characteristics vary from the standard form. For example, depending on the intensity of the light, exposing the pixels for a longer duration may improve image quality. Similarly, if the ambient light has a color spectrum that is skewed toward one particular color, then adjusting the length of exposure for a particular color of pixel in relation to others can facilitate correcting the color of the image as it will be perceived by an observer. In this way, the display 100 can leverage the ambient light to illuminate the display 100 while still providing accurate representations of images.

Figure 7:
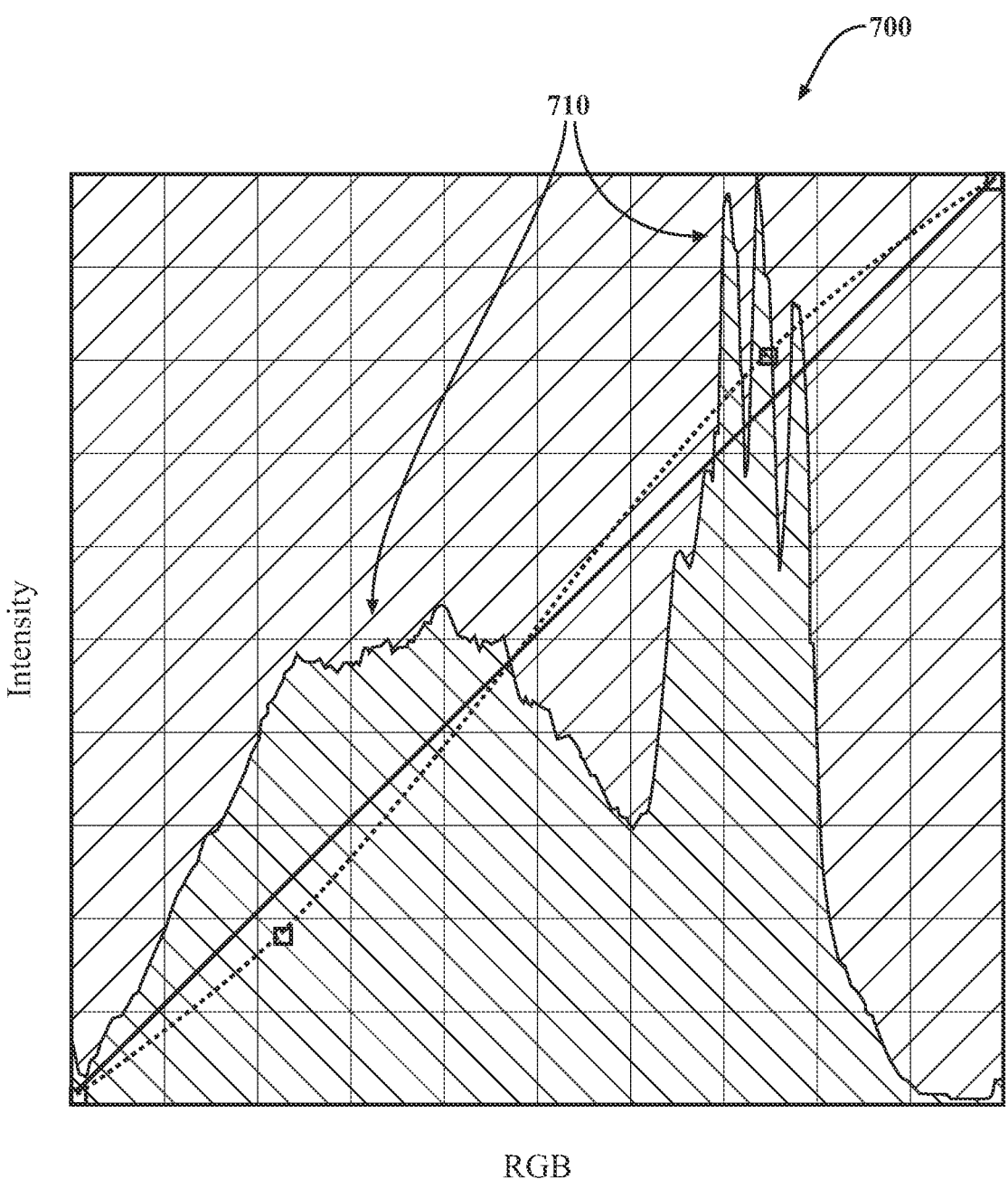
FIG. 7 is a graph showing the color spectrum characteristics of ambient light.

FIG. 7 illustrates one example of the characteristics of the ambient light. As illustrated, a graph 700 depicts a wavelength of color along the x-axis and intensity along the y-axis. The graph 700 shows multiple peaks as opposed to a balanced representation of the ambient light. Thus, in the instant example, the display 100 may change exposure lengths for associated colors to adjust for the relative intensities.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "operatively connected" and "communicatively coupled," as used throughout this description, can include direct or indirect connections, including connections without direct physical contact.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A display, comprising:

an inside transparent layer disposed parallel to and spaced apart from an outside transparent layer;

a liquid crystal (LC) layer disposed between the inside transparent layer and the outside transparent layer;

ground electrodes disposed between the LC layer and the outside transparent layer;

pixel electrodes disposed between the inside transparent layer and the LC layer; and light filters arranged relative to the pixel electrodes and the ground electrodes to form pixels with separate colors of each of the pixels being formed from individual ones of the light filters, wherein the display is configured to use external ambient light that is incident on the display as a light source for illuminating the pixels via the light filters without the use of a light emitting device, wherein a viewable region of the display includes transparent area where no subpixels are formed, and wherein the transparent area transmits incident light.

2. The display of claim 1, wherein the light filters are bandpass filters and include separate filters for red light, green light, and blue light, and wherein respective ones of the pixels are separately formed from subpixels comprising the light filters.

3. The display of claim 1, wherein the pixel electrodes are formed into separate strips for respective colors associated with subpixels that are perpendicular to the ground electrodes, and wherein the ground electrodes, the pixel electrodes, and the light filters form the pixels at overlaid intersections to scatter ambient light from the display.

4. The display of claim 1, wherein the pixels scatter ambient light passed by the light filters by activating the LC layer between the ground electrodes and the pixel electrodes.

5. The display of claim 1, wherein the pixel electrodes and the ground electrode have widths in a range of 10-150 μm.

6. The display of claim 1, further comprising:

masks positioned between the pixel electrodes and the inside transparent layer at overlaid intersections to block light from the light filters being transmitted through the inside transparent layer, wherein respective ones of the pixels having at least 65% white space relative to associated areas of the masks to provide for the display to be transparent.

7. The display of claim 6, wherein the masks are comprised of reflective material on a first side and light-absorbing material on a second side, and wherein each of the pixels includes subpixels that define RGB color filters defining an area that complements the white space.

8. The display of claim 1, wherein the light source for the display is the external ambient light that is not generated by the display.

9. The display of claim 1, wherein the display is a single-sided display that displays content through the outside transparent layer using the external ambient light while the display remains transparent for viewing an exterior environment through the inside transparent layer.

10. The display of claim 1, further comprising:

a control module configured to acquire characteristics of ambient light from at least one sensor of the display and to control the pixels to display an image according to the characteristics by adjusting a duration of exposure for subpixels to account for variations in the characteristics.

11. The display of claim 10, where the characteristics include at least light intensity and a color spectrum.

12. The display of claim 1, wherein subpixels comprise about 30% of an area of each of the pixels.

13. The display of claim 1, wherein the LC layer is a graded cholesteric liquid crystal (CLC).

14. The display of claim 1, further comprising:

polystyrene supports extending between the inside transparent layer and the outside transparent layer;

a first polyimide layer disposed adjacent to the outside transparent layer; and a second polyimide layer disposed adjacent to the inside transparent layer, wherein the first polyimide layer and the second polyimide layer facilitate aligning the LC layer.

15. The display of claim 1, further comprising:

a driver circuit configured to selectively activate the pixel electrodes to generate images on the display.

16. The display of claim 1, wherein the display is implemented within a vehicle window or as a window of a building.

17. A transparent display, comprising:

an inside transparent layer disposed parallel to and spaced apart from an outside transparent layer;

a liquid crystal (LC) layer disposed between the inside transparent layer and the outside transparent layer and being formed from a graded cholesteric liquid crystal (CLC);

ground electrodes disposed between the LC layer and the outside transparent layer;

pixel electrodes disposed between the inside transparent layer and the LC layer; and pixels formed from an arrangement of light filters relative to the pixel electrodes and the ground electrodes with subpixels of separates ones of the pixels being formed from individual ones of the light filters, wherein the transparent display is configured to use external ambient light that is incident on the transparent display as a light source for illuminating the pixels via the light filters without the use of a light emitting device.

18. The transparent display of claim 17, further comprising:

a control module configured to acquire characteristics of ambient light from at least one sensor of the display and to control the pixels to display an image according to the characteristics by adjusting a duration of exposure for the subpixels to account for variations in the characteristics.

19. A vehicle window, comprising:

an inside transparent layer disposed parallel to and spaced apart from an outside transparent layer;

a liquid crystal (LC) layer disposed between the inside transparent layer and the outside transparent layer and being formed from a graded cholesteric liquid crystal (CLC);

ground electrodes disposed between the LC layer and the outside transparent layer;

pixel electrodes disposed between the inside transparent layer and the LC layer;

pixels form from an arrangement of light filters relative to the pixel electrodes and the ground electrodes with subpixels of separate ones of the separate pixels being formed from individual ones of the light filters, wherein the vehicle window is configured to use external ambient light that is generated externally as a light source for illuminating the pixels via the light filters without the use of a light emitting device.

* * * * *